United States Patent
Azuma et al.

(10) Patent No.: US 8,254,900 B2
(45) Date of Patent: Aug. 28, 2012

(54) IN-VEHICLE APPARATUS, CELLULAR PHONE DEVICE, AND METHOD FOR CONTROLLING COMMUNICATION THEREBETWEEN

(75) Inventors: Kazuyoshi Azuma, Kariya (JP); Souichi Saitoh, Obu (JP); Kenji Miyake, Anjo (JP)

(73) Assignee: Denso Corporation, Kariya (JP)

( * ) Notice: Subject to any disclaimer, the term of this patent is extended or adjusted under 35 U.S.C. 154(b) by 328 days.

(21) Appl. No.: 12/590,611

(22) Filed: Nov. 11, 2009

(65) Prior Publication Data

US 2010/0151833 A1  Jun. 17, 2010

(30) Foreign Application Priority Data

Dec. 4, 2008  (JP) .................. 2008-309655

(51) Int. Cl.
*H04M 3/00* (2006.01)
*H04B 1/38* (2006.01)
(52) U.S. Cl. ........................ 455/418; 455/557
(58) Field of Classification Search .................. None
See application file for complete search history.

(56) References Cited

U.S. PATENT DOCUMENTS

| | | | | |
|---|---|---|---|---|
| 7,089,035 B2* | 8/2006 | Ando et al. | ........... | 455/557 |
| 7,912,502 B2* | 3/2011 | Ando et al. | ........... | 455/557 |
| 7,970,436 B1* | 6/2011 | Katzer et al. | ........... | 455/557 |
| 2002/0142803 A1* | 10/2002 | Yamamoto | ........... | 455/557 |
| 2003/0211865 A1* | 11/2003 | Azami et al. | ........... | 455/557 |
| 2003/0228879 A1* | 12/2003 | Witkowski et al. | ........ | 455/550.1 |
| 2007/0042812 A1* | 2/2007 | Basir | ........... | 455/569.2 |
| 2008/0139178 A1 | 6/2008 | Kawasaki | | |

FOREIGN PATENT DOCUMENTS

| | | |
|---|---|---|
| JP | 2003-174676 | 6/2003 |
| JP | 2003-256341 | 9/2003 |
| JP | 2005-176194 | 6/2005 |
| JP | 2006-080575 | 3/2006 |
| JP | 2006-325116 | 11/2006 |

* cited by examiner

*Primary Examiner* — Jinsong Hu
*Assistant Examiner* — William Nealon
(74) *Attorney, Agent, or Firm* — Harness, Dickey & Pierce, PLC (57) ABSTRACT

A communication unit communicates with a cellular phone device simultaneously using a handsfree communication protocol for handsfree communication and a mail transfer protocol for mail transfer. The cellular phone device is selectively in one of: i) a handsfree communication state where voice is transmitted via voice units of the in-vehicle apparatus when opening a voice path with the in-vehicle apparatus using the handsfree communication protocol; and ii) a handset communication state where voice is transmitted via voice units of the cellular phone when closing the voice path. The control unit notifies an incoming mail in a normal manner when the cellular phone device is in the handsfree communication state. Alternatively, the control unit notifies an incoming mail such that an occupant other than a user hardly notices an incoming mail when the cellular phone device is in the handset communication state.

14 Claims, 6 Drawing Sheets

IN-VEHICLE APPARATUS, CELLULAR PHONE DEVICE, AND METHOD FOR CONTROLLING COMMUNICATION THEREBETWEEN

CROSS REFERENCE TO RELATED APPLICATIONS

This application is based on and incorporates herein by reference Japanese Patent Application No. 2008-309655 filed on Dec. 4, 2008.

FIELD OF THE INVENTION

The present invention relates to an in-vehicle apparatus having a handsfree function and configured to communicate with a cellular phone device simultaneously using a handsfree communication protocol for handsfree communication and a mail transfer protocol for mail transfer. The present invention further relates to a cellular phone device configured to communicate with the in vehicle apparatus simultaneously using the handsfree communication protocol and the mail transfer protocol. The present invention further relates to a method for controlling communication between the in-vehicle apparatus and the cellular phone device. The present invention further relates to a program product including the method.

BACKGROUND OF THE INVENTION

For example, JP-A-2003-256341 discloses a cellular phone device having a Bluetooth (BT: registered trademark) communication function. The cellular phone device is carried into an interior of a vehicle equipped with an in-vehicle apparatus having the BT communication function. When the cellular phone device receives an incoming mail from a communication network in a state where the cellular phone device is communicable with the in-vehicle apparatus via a BT communication, the in-vehicle apparatus does not notify an incoming mail during an driving operation of the vehicle, and thereafter, the in-vehicle apparatus notifies an incoming mail subsequent to stop of the driving operation of the vehicle.

In JP-A-2003-256341, the in-vehicle apparatus notifies an incoming mail, which is received during a driving operation, subsequent to stop of the driving operation. Therefore, the in-vehicle apparatus cannot notify an incoming mail in real time. Therefore, an in-vehicle apparatus, which enables notification of an incoming mail in real time, is demanded. The telecommunications standard of BT defines the message access profile (MAP) for producing mail transfer. So as to enable notification of an incoming mail in real time, the MAP is studied.

On the other hand, a cellular phone device in an interior of a vehicle mainly uses mainly handsfree communication. The telecommunications standard of BT further defines the handsfree profile (HFP) for handsfree communication. A cellular phone device and an in-vehicle handsfree device are in either a handsfree communication state or a handset communication state when communicating using the HFP. In the handsfree communication state, a user uses a microphone and a speaker of an in-vehicle handsfree device. In the handset communication state, a user uses a microphone and a speaker of a cellular phone device. It is assumed that a user selects the handsfree communication when a user does not mind if another occupant in the vehicle hears contents of telephone call, in particular, incoming voice from a counterpart. Alternatively, it is assumed that a user selects the handsfree communication when a user minds if another occupant in the vehicle hears contents of telephone call.

In view of such a situation, the applicants of the present invention studies communication between an in-vehicle handsfree device and with a cellular phone device simultaneously using the MAP and the HFP so as to enable notification of an incoming mail to a user in real time, while a user performs handsfree communication. When a cellular phone device in the handsfree communication state receives an incoming mail from a communication network, the cellular phone device sends notice of incoming mail to an in-vehicle handsfree device using the MAP. Thereby, the in-vehicle handsfree device outputs notice of incoming mail sound. A user hears the notice of incoming mail sound thereby to recognize an incoming mail. Alternatively, when a cellular phone device in the handset communication state receives an incoming mail from a communication, network, the in-vehicle handsfree device outputs notice of incoming mail sound, similarly to the case where the cellular phone device in the handsfree communication state receives an incoming mail from a communication network. Thus, a user hears the notice of incoming mail sound thereby to recognize an incoming mail.

It is noted that when as user sets the cellular phone device in the handset communication state, a user may want to secure privacy. In consideration of such a condition, incoming mail sound outputted from an in-vehicle handsfree device may notify another occupant of an incoming mail. Such a notification of an incoming mail may be against intention of a user who wants to secure privacy.

SUMMARY OF THE INVENTION

In view of the foregoing and other problems, it is an object of the present invention to produce an in-vehicle apparatus and a cellular phone device having a handsfree function, which enables a user to treat appropriately an incoming mail without spoiling of user's intension when the cellular phone device in a handset communication state receives an incoming mail. It is another object of the present invention to produce a method for controlling communication between the in-vehicle apparatus and the cellular phone device. It is another object of the present invention to produce a program product including the method.

According to one aspect of the present invention, an in-vehicle apparatus having a handsfree function, the in-vehicle apparatus comprises a communication unit configured to communicate with a cellular phone device simultaneously using a handsfree communication protocol for handsfree communication and a mail transfer protocol for mail transfer, the cellular phone device being selectively in one of: i) a handsfree communication state where outgoing voice inputted via a voice input unit of the in-vehicle apparatus is transmitted to a counterpart, and incoming voice transmitted from a counterpart is outputted via a voice output unit of the in-vehicle apparatus when opening a voice path with the in-vehicle apparatus and when communicating with the in-vehicle apparatus using the handsfree communication protocol; and ii) a handset communication state where outgoing voice inputted via a voice input unit of the cellular phone device is transmitted to a counterpart, and incoming voice transmitted from a counterpart is outputted via a voice output unit of the cellular phone device when closing the voice path with the in-vehicle apparatus. The in-vehicle apparatus further comprises an incoming mail determination unit configured to determine whether the cellular phone device, which communicates with the communication unit using the mail transfer protocol, receives an incoming mail. The in-vehicle apparatus further comprises a condition determination unit configured to determine whether the cellular phone device, which communicates with the communication unit using the handsfree communication protocol, is one of the handsfree communication state and the handset communication state. The in-vehicle apparatus further comprises a control unit: configured to perform notice of incoming mail for notifying a user of an incoming mail in a handsfree mode in a condition where: i) the incoming mail determination unit determines that the cellular phone device, which communicates with the communication unit using the mail transfer protocol, receives an incoming mail; and ii) the condition determination unit determines that the cellular phone device is in the handsfree communication state, and configured to perform notice of incoming mail for notifying a user of an incoming mail in a handset mode, such that an occupant other than a user hardly notices an incoming mail compared with the handsfree mode, in a condition where: i) the incoming mail determination unit determines that the cellular phone device, which communicates with the communication unit using the mail transfer protocol, receives an incoming mail; and ii) the condition determination unit determines that the cellular phone device is in the handset communication state.

According to another aspect of the present invention, an in-vehicle apparatus having a handsfree function, the in-vehicle apparatus comprises a communication unit configured to communicate with a cellular phone device simultaneously using a handsfree communication protocol for handsfree communication and a mail transfer protocol for mail transfer, the cellular phone device being selectively in one of: i) a handsfree communication state where outgoing voice inputted via a voice input unit of the in-vehicle apparatus is transmitted to a counterpart, and incoming voice transmitted from a counterpart is outputted via a voice output unit of the in-vehicle apparatus when opening a voice path with the in-vehicle apparatus and when communicating with the in-vehicle apparatus using the handsfree communication protocol; and ii) a handset communication state where outgoing voice inputted via a voice input unit of the cellular phone device is transmitted to a counterpart, and incoming voice transmitted from a counterpart is outputted via a voice output unit of the cellular phone device when closing the voice path with the in-vehicle apparatus. The in-vehicle apparatus further comprises an incoming mail determination unit configured to determine whether the cellular phone device, which communicates with the communication unit using the mail transfer protocol, receives an incoming mail. The in-vehicle apparatus further comprises a condition determination unit configured to determine whether the cellular phone device, which communicates with the communication unit using the handsfree communication protocol, is in one of the handsfree communication state and the handset communication state. The in-vehicle apparatus further comprises a control unit configured to perform notice of incoming mail for notifying a user of an incoming mail in a condition where: i) the incoming mail determination unit determines that the cellular phone device, which communicates with the communication unit using the mail transfer protocol, receives an incoming mail; and ii) the condition determination unit determines that the cellular phone device is in the handsfree communication state, and configured not to perform notice of incoming mail for notifying a user of an incoming mail in a condition where: i) the incoming mail determination unit determines that the cellular phone device, which communicates with the communication unit using the mail transfer protocol, receives an incoming mail; and ii) the condition determination unit determines that the cellular phone device is in the handset communication state.

According to another aspect of the present invention, a cellular phone device configured to communicate with an in-vehicle apparatus having a handsfree function simultaneously using a handsfree communication protocol for handsfree communication and a mail transfer protocol for mail transfer, wherein the cellular phone device being selectively in one of: i) a handsfree communication state where outgoing voice inputted via a voice input unit of the in-vehicle apparatus is transmitted to a counterpart and incoming voice transmitted from a counterpart is outputted via a voice output unit of the in-vehicle apparatus when opening a voice path with the in-vehicle apparatus and when communicating with the in-vehicle apparatus using a handsfree communication protocol; and ii) a handset communication state where outgoing voice inputted via a voice input unit of the cellular phone device is transmitted to a counterpart, and incoming voice transmitted from a counterpart is outputted via a voice output unit of the cellular phone device when closing the voice path with the in-vehicle apparatus. In a condition where the cellular phone device communicates with the in-vehicle apparatus simultaneously using the handsfree communication protocol and the mail transfer protocol: i) the cellular phone device sends notice of incoming mail to the in-vehicle apparatus when the cellular phone device is in the handsfree communication state and when the cellular phone device receives an incoming mail; and ii) the cellular phone device does not send notice of incoming mail to the in-vehicle apparatus when the cellular phone device is in the handset communication state and when the cellular phone device receives an incoming mail.

According to another aspect of the present invention, a method for controlling communication between an in-vehicle apparatus and a cellular phone device, the method comprises communicating the in-vehicle apparatus with the cellular phone device simultaneously using a handsfree communication protocol for handsfree communication and a mail transfer protocol for mail transfer. The method further comprises determining whether the cellular phone device is in one of: i) a handsfree communication state where outgoing and incoming voice is transmitted via input and output units of the in-vehicle apparatus when opening a voice path with the in-vehicle apparatus and communicating with the in-vehicle apparatus using the handsfree communication protocol; and ii) a handset communication state where outgoing and incoming voice is transmitted via input and output units of the cellular phone device when closing the voice path. The method further comprises determining whether the cellular phone device receives an incoming mail. The method further comprises notifying a user of an incoming mail in a handsfree mode in response to determination that the cellular phone device is in the handsfree communication state and determination that the cellular phone device receives an incoming mail. The method further comprises notifying a user of an incoming mail in a handset mode in response to determination that the cellular phone device is in the handset communication state and determination that the cellular phone device receives an incoming mail, such that an occupant other than a user hardly notices an incoming mail compared with the handsfree mode.

According to another aspect of the present invention, a method for controlling communication between an in-vehicle apparatus and a cellular phone device, the method comprises communicating the in-vehicle apparatus with the cellular phone device simultaneously using a handsfree communication protocol for handsfree communication and a mail transfer protocol for mail transfer. The method further comprises determining whether the cellular phone device is in one of: i) a handsfree communication state where outgoing and incoming voice is transmitted via input and output units of the in-vehicle apparatus when opening a voice path with the in-vehicle apparatus and communicating with the in-vehicle apparatus using the handsfree communication protocol; and ii) a handset communication state where outgoing and incoming voice is transmitted via input and output units of the cellular phone device when closing the voice path. The method further comprises determining whether the cellular phone device receives an incoming mail. The method further comprises notifying a user of an incoming mail in response to determination that the cellular phone device receives an incoming mail and determination that the cellular phone device is in the handsfree communication state. The method further comprises not notifying a user of an incoming mail in response to determination that the cellular phone device receives an incoming mail and determination that the cellular phone device is in the handset communication state.

According to another aspect of the present invention, a method for controlling communication between a cellular phone device and an in-vehicle apparatus, the method comprises communicating the cellular phone device with the in-vehicle apparatus simultaneously using a handsfree communication protocol for handsfree communication and a data transfer protocol for data transfer. The method further comprises sending notice of incoming mail from the cellular phone device to the in-vehicle apparatus when the cellular phone device receives an incoming mail and when the cellular phone device is in a handsfree communication state where outgoing and incoming voice is transmitted via input and output units of the in-vehicle apparatus when opening a voice path with the in-vehicle apparatus and communicating with the in-vehicle apparatus using the handsfree communication protocol. The method further comprises not sending notice of incoming mail from the cellular phone device to the in-vehicle apparatus when the cellular phone device receives an incoming mail and when the cellular phone device is in a handset communication state where outgoing and incoming voice is transmitted via input and output units of the cellular phone device when closing the voice path.

According to another aspect of the present invention, a program product comprising instructions being executed by a computer, the instructions including the method for controlling communication between an in-vehicle apparatus and a cellular phone device.

According to another aspect of the present invention, a Program product comprising instructions being executed by a computer, the instructions including the method for controlling communication between a cellular phone device and an in-vehicle apparatus.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

As follows, the present embodiment will be described with reference to FIGS. 1 to 8. In the present description, it is assumed that a vehicle has an in-vehicle handsfree device having a handsfree function of a Bluetooth (BT: registered trademark) communication function. The in-vehicle handsfree device is an example of an in-vehicle apparatus with a handsfree function. Further, a cellular-phone device having the BT communication function is carried into an interior of the vehicle. In the present state, the in-vehicle handsfree device and the cellular phone device are communicable via the BT communication function.

Figure 1:
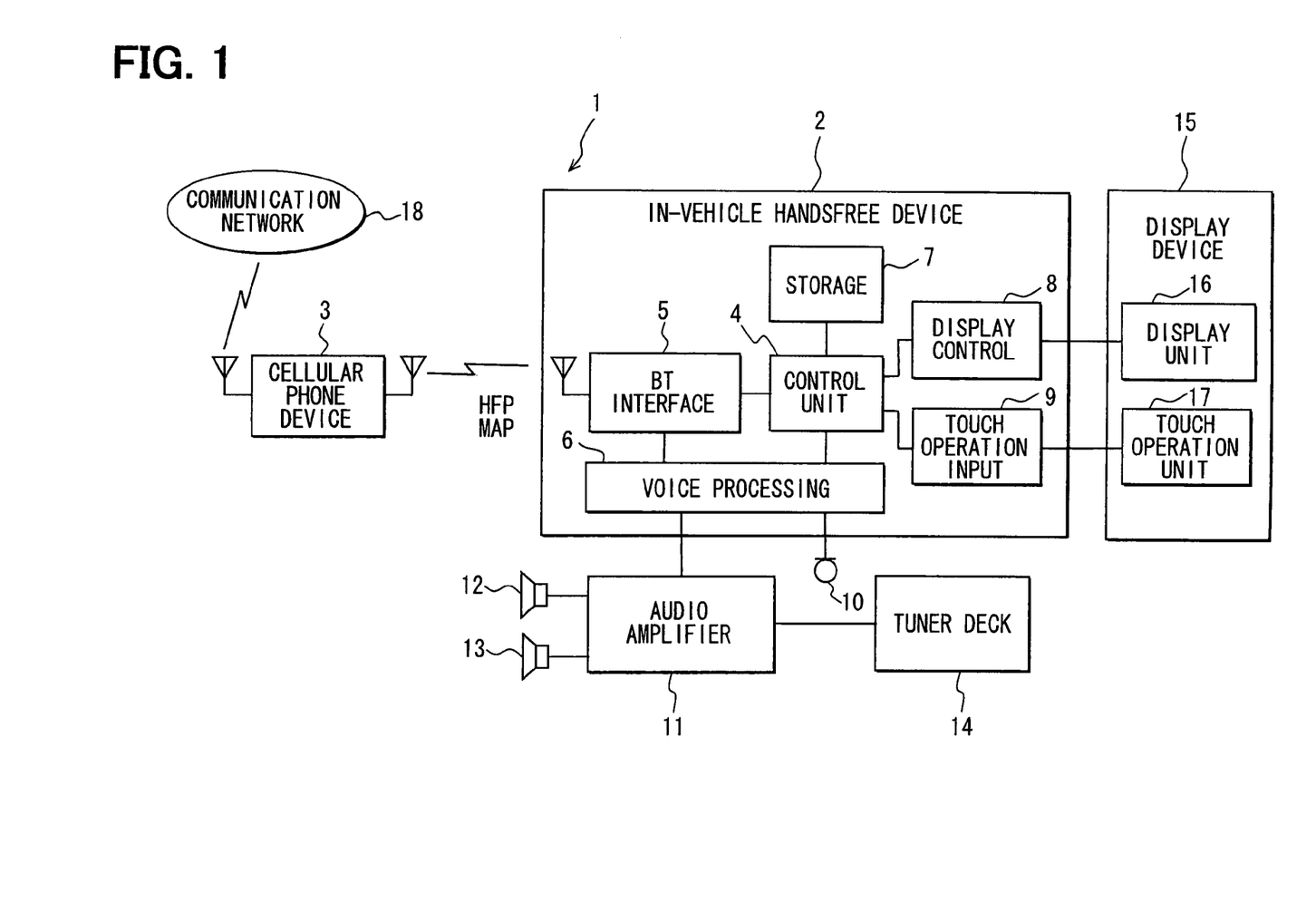
FIG. 1 is a functional block diagram showing an in-vehicle apparatus and a cellular phone device according to the first embodiment of the present invention.

An in-vehicle handsfree system 1 includes an in-vehicle handsfree device 2 and a cellular phone device 3. The in-vehicle handsfree device 2 includes a control unit 4, a BT interface portion 5, a telephone voice processing portion 6, a storage portion 7, and a display control portion 8, and a touch operation input portion 9. The control unit 4 is an example of an incoming mail determination unit, a condition determination unit, and a control unit. The BT interface portion 5 is an example of a communication unit.

The control unit 4 may be a generally-known microcomputer including a CPU, a RAM, a ROM, an I/O bus, and the like. The control unit 4 controls an operation such as a communication and a data management of the in-vehicle handsfree device 2. The BT interface portion 5 has a function to perform a BT communication with the cellular phone device 3. Specifically, the BT interface portion 5 can use the handsfree profile (HFP) for performing handsfree telephone call and the message access profile (MAP) for transmission of a mail (E-mail). The HFP and the MAP are defined by the telecommunications standard of BT. The HFP is an example of a handsfree communication protocol. The MAP is an example of a mail transfer protocol. The BT interface portion 5 is capable of cocurrent connection (multi-connection) of the HFP and the MAP. The mail (E-mail) is a general term of information such as a character message and image data exchanged via a generally-known computer network. In addition to the HFP and the MAP, the BT interface portion 5 may further use the phone book access profile (PBAP), the object push profile (OPP), and the like. The phone book access profile (PBAP) is used for transmission of telephone directory data, outgoing history data, and incoming history data. The object push profile (OPP) is used for transfer of various data. The present profiles are communication protocols assigned respectively to functions. The telephone voice processing portion 6 is connected with a microphone 10 and an audio amplifier 11. The microphone 10 is located in the vehicle interior. More specifically, for example, the microphone 10 is located such that the microphone 10 can easily collect voice of a user close to a handle. The audio amplifier 11 is an exterior device of the in-vehicle handsfree device 2 and connected with two speakers 12 and 13. The microphone 10 is an example of a voice input unit at the side of the handsfree apparatus. The two speakers 12 and 13 are examples of a voice output unit at the side of the handsfree apparatus. Speakers 12 and 13 may be symmetric with respect to the longitudinal direction of the vehicle equipped with the in-vehicle handsfree device 2. For example, one speaker 12 is located at a door of a driver's seat, and the other speaker 13 is located at a door of a passenger seat. The audio amplifier 11 is further connected with a tuner deck 14. For example, the audio amplifier 11 inputs an audio signal of audio contents such as a music content obtained from a recording medium and a radio program received from a radio station using the tuner deck 14. The audio amplifier 11 amplifies the audio signal and thereby to output the audio contents via the speakers 12 and 13.

The storage portion 7 is capable of storing various data. For example, the storage portion 7 is capable of storing the telephone directory data, the outgoing history data, and the incoming history data, for example. The telephone directory data specifies correspondence between a telephone number and a registered name. The outgoing history data specifies correspondence between outgoing time (time of origin) and an outgoing telephone number. The outgoing telephone number is related to an outgoing operation (transmission) from the in-vehicle handsfree device 2 or to an outgoing operation from the cellular phone device 3, which is connected with the in-vehicle handsfree device 2 via the HFP. The incoming history data specifies correspondence between incoming time and an incoming telephone number. The incoming telephone number is related to an incoming operation (reception) of the cellular phone device 3, which is connected with the in-vehicle handsfree device 2 via the HFP.

A display device 15 includes a display unit 16 and a touch operation unit 17. The display unit 16 displays various kinds of information. The display unit 16 is an example of a display unit at the side of the in-vehicle handsfree device. The touch operation unit 17 has a touch sensor on a display screen. The display control portion 8 inputs an instruction from the control unit 4 and controls display of information on the display unit 16 of the display device 15 based on the inputted instruction. The touch operation input portion 9 inputs instruction of a user according to a user's operation of the touch sensor of the touch operation unit 17 via the display screen. The touch operation input portion 9 outputs the inputted instruction to the control unit 4. The control unit 4 analyzes the instruction inputted from the touch operation input portion 9.

The cellular phone device 3 includes a control unit, a telecommunication portion, a BT interface portion, a key portion, a storage portion, a display portion, a microphone, a speaker, and the like. The control unit controls of an entire operation of the cellular phone device 3. The telecommunication portion performs telephonic communication with a communication network 18. The BT interface portion performs BT communication. The key portion includes various keys arranged on the key portion and operated by a user. The storage portion stores various data such as telephone directory data specifying correspondence between a telephone number and a registered name. The display portion displays various information on a display screen. The microphone inputs voice of a user. The speaker outputs voice received from a counterpart. The microphone is an example of a voice input unit of the cellular phone device. The speaker is an example of a voice output unit of the cellular phone device. In the present embodiment, the BT interface portion of the cellular phone device 3 has a function to perform the BT communication with the in-vehicle handsfree device 2. Similarly to the BT interface portion 5 of the in-vehicle handsfree device 2, the BT interface portion of the cellular phone device 3 can use the HFP and the MAP and communicate with the in-vehicle handsfree device 2 simultaneously using the HFP and the MAP.

As follows, an operation when the in-vehicle handsfree device 2 is communicable with the cellular phone device 3 via the HFP and when the cellular phone device 3 receives an incoming call from the communication network 18 will be described. The communication network 18 includes a cellular-phone base station and a facility, which provides a generally-known communication service, such as a base station control, for a cellular phone.

When the cellular phone device 3 communicates with the in-vehicle handsfree device 2 via the HFP and when the cellular phone device 3 detects an incoming call from the communication network 18, the cellular phone device 3 transmits notice of incoming call to the in-vehicle handsfree device 2 for notifying the incoming call. In response to the notification, the cellular phone device 3 transmits notice of incoming call to the in-vehicle handsfree device 2. The notice of incoming call includes identification information such as a telephone number stored in the cellular phone device 3 for identifying the cellular phone device of a counterpart. In this case, when the cellular phone device 3 receives a telephone number of a counterpart from the communication network 18, the cellular phone device 3 transmits notice of incoming call to the in-vehicle handsfree device 2. The notice of incoming call includes a telephone number of a counterpart received from the communication network 18. When the cellular phone device 3 can use in-band ringtone, the cellular phone device 3 further transmit ringtone stored in the cellular phone device 3 to the in-vehicle handsfree device 2.

In the in-vehicle handsfree device 2, the control unit 4 causes the speakers 12 and 13 to output ringtone stored in the in-vehicle handsfree device 2 when receiving notice of incoming call from the cellular phone device 3 via the BT interface portion 5 and when not receiving ringtone from the cellular phone device 3. Alternatively, the control unit 4 causes the speakers 12 and 13 to output ringtone, which is stored in the cellular phone device 3 and received from the cellular phone device 3, when receiving notice of incoming call and the ringtone from the cellular phone device 3 via the BT interface portion 5. Thereby, a user is notified of incoming call received by the cellular phone device 3. Further, as shown in FIG. 2, the control unit 4 causes the display unit 16 to display an incoming call notice screen 19, which indicates a state where the cellular phone device 3 receives an incoming call.

Thereby, a user can recognize the state where the cellular phone device 3 receives an incoming call by hearing the ringtone outputted from the speakers 12 and 13 and viewing the incoming call notice screen 19 displayed on the display unit 16. The user recognizes that the cellular phone device 3 receives the incoming call, and thereby the user can select either responding to the incoming call of the cellular phone device 3 by handsfree communication or refusing the incoming call by manipulating the in-vehicle handsfree device 2. Alternatively, in this case, the user can select either responding to the incoming call of the cellular phone device 3 by private communication (handset communication) or refusing the incoming call by manipulating the cellular phone device 3. The handsfree communication is performed by transmitting and receiving voice using the microphone 10 and the speakers 12 and 13 connected with the in-vehicle handsfree device 2 in a state where the cellular phone device 3 and the in-vehicle handsfree device 2 therebetween open a voice path. The private communication is performed by transmitting and receiving voice using the microphone and the speaker of the cellular phone device 3 in a state where the cellular phone device 3 and the in-vehicle handsfree device 2 therebetween close the voice path.

Figure 2:
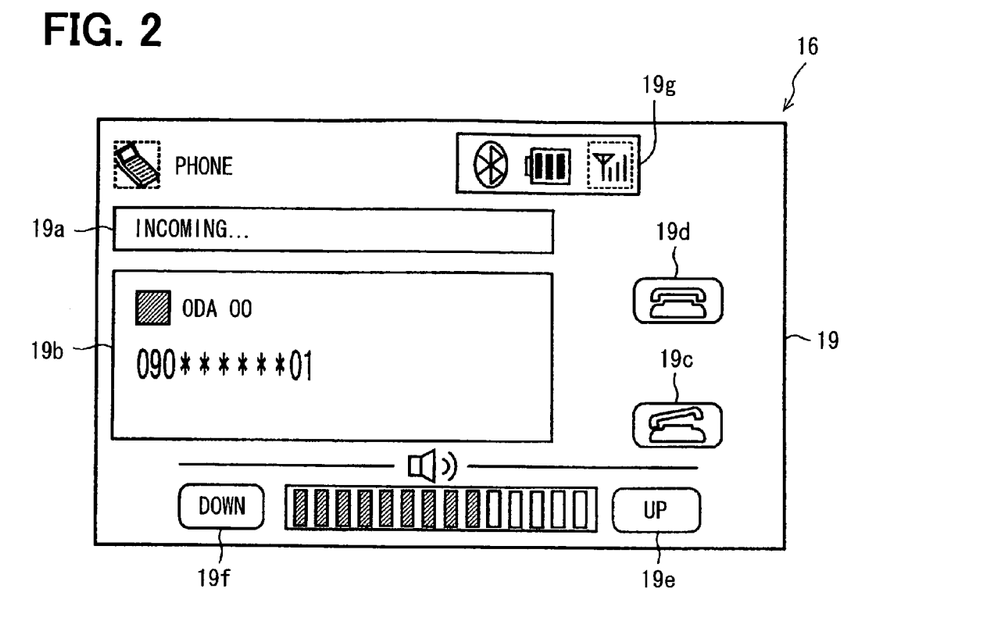
FIG. 2 is a schematic view showing an incoming call notice screen.

In FIG. 2, the cellular phone device 3 receives an incoming call from the communication network 18, and the in-vehicle handsfree device 2 receives the number of "090****01" as a telephone number of a sender (outgoing side) of an incoming call from the cellular phone device 3. Further, in FIG. 2, the letter string of "Oda OO" is a registered name corresponding to the telephone number of the sender received from the cellular phone device 3. The letter string of "Oda OO" is stored as telephone directory data. The incoming call notice screen 19 displays a condition where the cellular phone device 3 receives an incoming call. Specifically, the control unit 4 causes a status display region 19a of the incoming call notice screen 19 to display a letter string of "Receiving. Incoming Call" to notify a condition where the cellular phone device 3 receives an incoming call. Further, the control unit 4 causes a sender information display region 19b to display the letter strings of "090****01" and "Oda OO" as information of the sender.

Further, the control unit 4 causes the incoming call notice screen 19 to display a response switch 19c, a response refusal switch 19d, an up switch 19e, and a down switch 19f. The response switch 19c is manipulated when a user responds to an incoming call. The response refusal switch 19d is manipulated when a user refuses an incoming call. The up switch 19e is manipulated when a user increases volume of ringtone outputted from the speakers 12 and 13. The down switch 19f is manipulated when a user decreases volume of ringtone outputted from the speakers 12 and 13. Further, the control unit 4 receives remaining power of a battery, of the cellular phone device 3 and a reception status of electric wave from the cellular phone device 3 receiving an incoming call. The control unit 4 causes a phone status display region 19g to display a remaining power icon and a reception status icon. The remaining power icon indicates the remaining power of the battery of the cellular phone device 3. The reception status icon indicates the reception status of electric wave.

When the cellular phone device 3 receives an incoming call and when the cellular phone device 3 is in an incoming call state, a user can:

respond to an incoming call of the cellular phone device 3 via the handsfree communication by manipulating the response switch 19c of the incoming call notice screen 19;

refuse an incoming call of the cellular phone device 3 by manipulating the response refusal switch 19d of the incoming call notice screen 19;

respond to an incoming, call of the cellular phone device 3 via the private communication by manipulating a response key of the cellular phone device 3; and refuse an incoming call of the cellular phone device 3 by manipulating a response refusal key of the cellular phone device 3.

Figure 3:
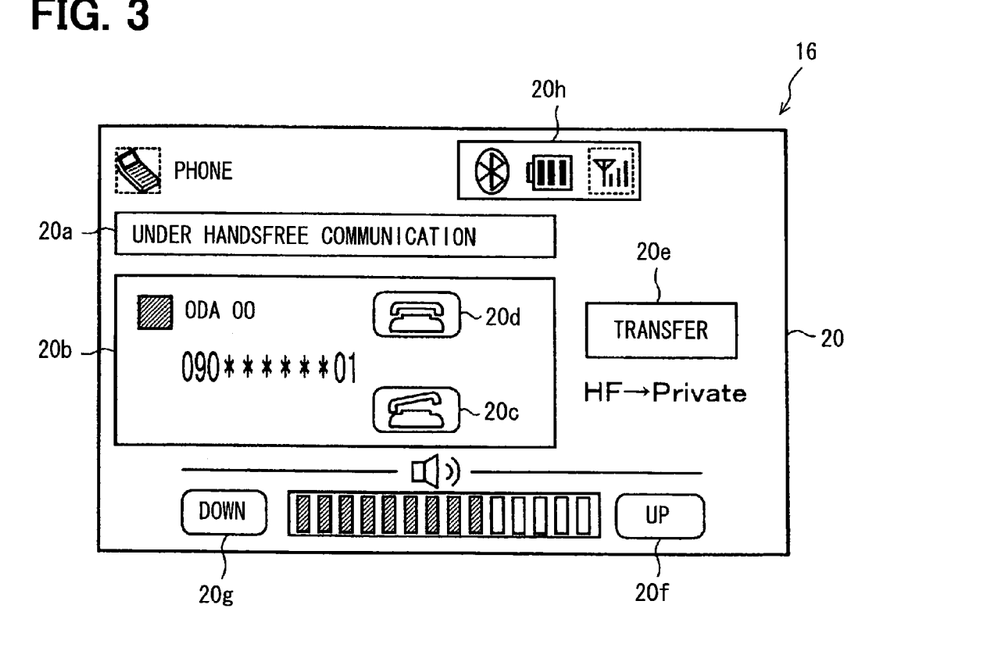
FIG. 3 is a schematic view showing an under handsfree communication notice screen.

FIG. 3 shows a state where a user manipulates the response switch 19c of the incoming call notice screen 19 (FIG. 3) and responds to an incoming call of the cellular phone device 3 via the handsfree communication. When the control unit 4 determines that a user manipulates the response switch 19c of the incoming call notice screen 19, the control unit 4 causes:

the cellular phone device 3 to perform a response operation to an incoming call; and the BT interface portion 5 and the cellular phone device 3 therebetween to open a voice path.

After the cellular phone device 3 changes from the incoming call state to a handsfree communication state where the cellular phone device 3 performs the handsfree communication, the control unit 4 changes the incoming call notice screen 19 shown in FIG. 2 to a under handsfree communication notice screen 20 shown in FIG. 3. The under handsfree communication notice screen 20 indicates the handsfree communication state.

The control unit 4 causes a status display region 20a of the under handsfree communication notice screen 20 to display a letter string of "Under Handsfree Communication" to notify the handsfree communication state. Further, the control unit 4 causes a sender information display region 20b to display the letter strings of "090******01" and "Oda OO" as information of the sender. Further, the control unit 4 causes the under handsfree communication notice screen 20 to display a hold switch 20c, a hang up switch 20d, a transfer switch 20e, an up switch 20f, and a down switch 20g. The hold switch 20c is manipulated when a user holds (suspends) the handsfree communication. The hang up switch 20d is manipulated when a user terminates the handsfree communication to hang up an incoming call. The transfer switch 20e is manipulated when a user changes the handsfree communication to the private communication to transmit an incoming call to the cellular phone device 3. The up switch 20f is manipulated when a user increases volume of the incoming voice outputted from the speakers 12 and 13. The down switch 20g is manipulated when a user decrease volume of the incoming voice outputted from the speakers 12 and 13. Further, the control unit 4 receives remaining power of a battery of the cellular phone device 3 and a reception status of electric wave from the cellular phone device 3. The control unit 4 causes a phone status display region 20h to display a remaining power icon and a reception status icon. The remaining power icon indicates the remaining power of the battery of the cellular phone device 3. The reception status icon indicates the reception status of electric wave.

Figure 4:
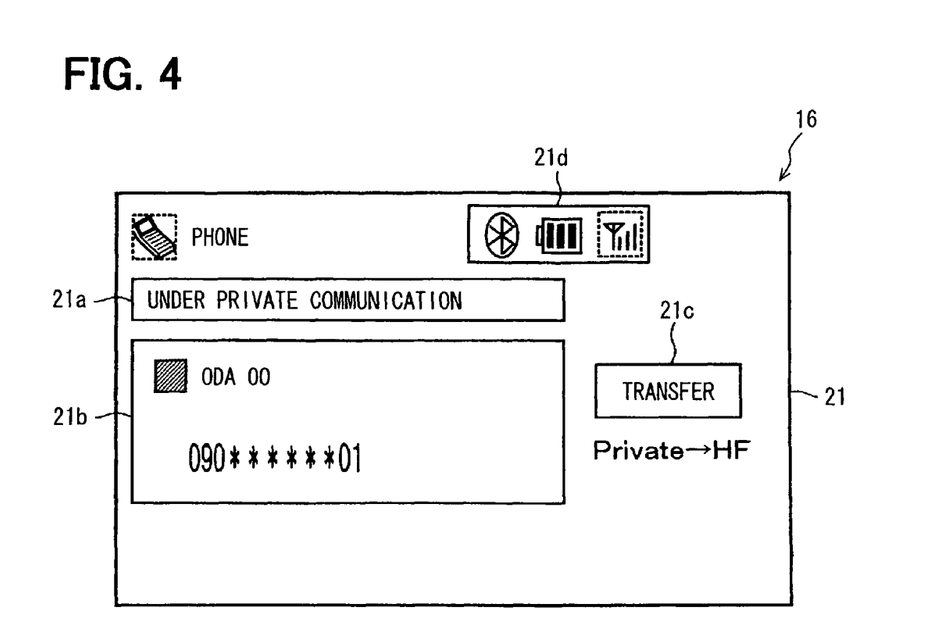
FIG. 4 is a schematic view showing an under private communication notice screen.

FIG. 4 shows a state where a user manipulates the response key of the cellular phone device 3 and responds to an incoming call of the cellular phone device 3 via the private communication. When the control unit 4 determines that a user manipulates the response key of the cellular phone device 3, the control unit 4 causes the cellular phone device 3 to perform a response operation to an incoming call. In this case, the BT interface portion 5 and the cellular phone device 3 therebetween do not open a voice path. After the cellular phone device 3 changes from the incoming call state to the private communication state, the control unit 4 changes an incoming call notice screen 19 shown in FIG. 2 to an under private communication notice screen 21 shown in FIG. 4. The under private communication notice screen 21 indicates the private communication state.

The control unit 4 causes a status display region 21a of the under private communication notice screen 21 to display a letter string of "Under Private Communication" to notify the private communication state. Further, the control unit 4 causes a sender information display region 21b to display the letter strings of "090******01" and "Oda OO" as information of the sender. Further, the control unit 4 causes the under private communication notice screen 21 to display a transfer switch 21c manipulated by a user to change the private communication to the handsfree communication. Further, the control unit 4 receives remaining power of a battery of the cellular phone device 3 and a reception status of electric wave from the cellular phone device 3. The control unit 4 causes a phone status display region 21d to display a remaining power icon and a reception status icon. The remaining power icon indicates the remaining power of the battery of the cellular phone device 3. The reception status icon indicates the reception status of electric wave.

Figure 5:
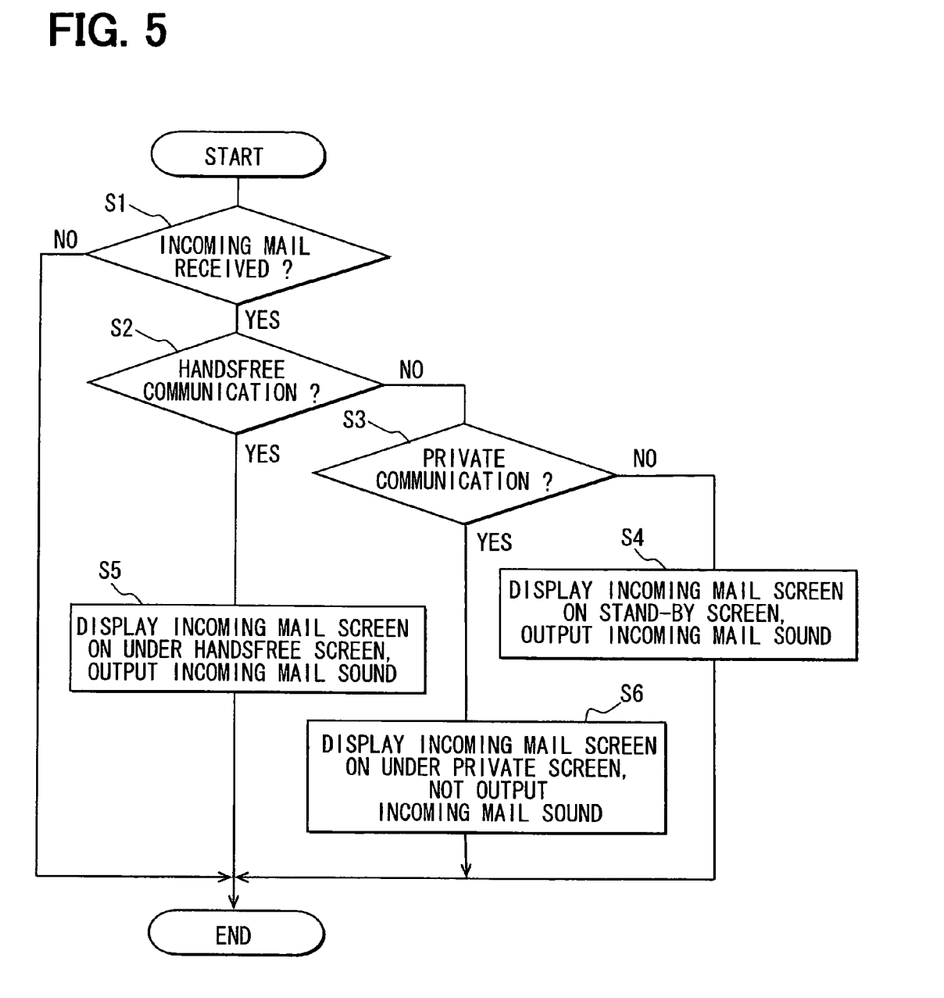
FIG. 5 is a flowchart showing an operation of the in-vehicle apparatus according to the first embodiment.

As follows, an operation of the above-described configuration will be described with reference to FIGS. 5 to 8. FIG. 5 is a flow chart showing an operation of the in-vehicle handsfree device 2. At step S1, the control unit 4 of the in-vehicle handsfree device 2 starts an incoming mail detection operation to determine whether the cellular phone device 3 receives an incoming mail from the communication network 18. When the control unit 4 determines that the cellular phone device 3 does not receive an incoming mail from the communication network 18, step S1 makes a negative determination. In this case, the control unit 4 terminates the mail detection operation and performs another operation such as a main operation.

When the control unit 4 determines that the cellular phone device 3 receives an incoming mail from the communication network 18 according to a notice of incoming mail inputted from, the cellular phone device 3, step S1 makes a positive determination. In this case, at step S2, S3, the control unit 4 determines whether the cellular phone device 3, which receives an incoming mail, is in either the handsfree communication state, the private communication state; or a stand-by state according to a notice of state (notice of incoming mail) inputted from the cellular phone device 3. In the stand-by state, the cellular phone device 3 is waiting an incoming call.

Figure 6:
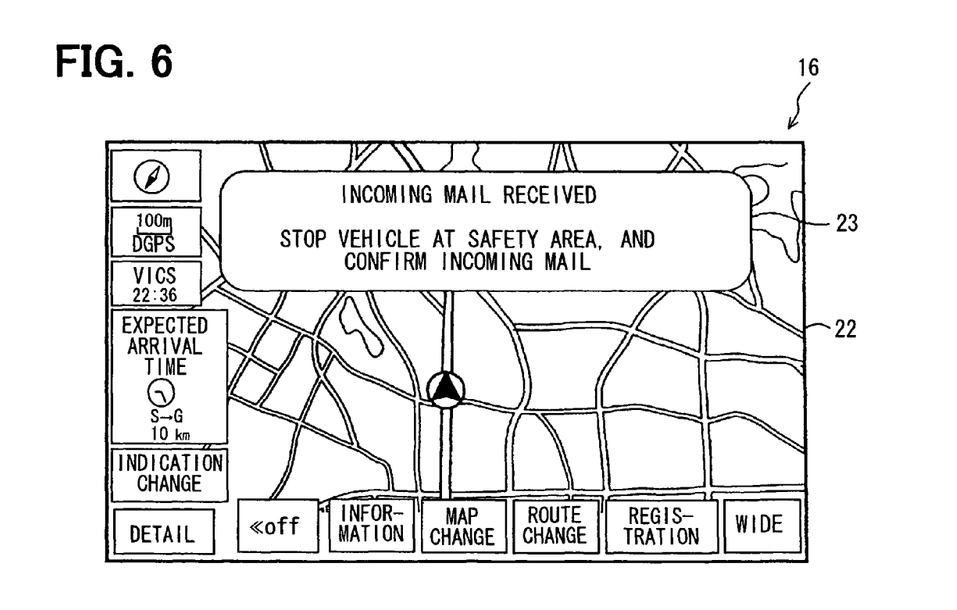
FIG. 6 is a schematic view showing a notice of incoming mail screen displayed on a stand-by screen.

When the control unit 4 determines that the cellular phone device 3, which receives the incoming mail, is not in the handsfree communication state according to the notice of state inputted from the cellular phone device 3, step S2 makes a negative determination. When the control unit 4 determines that the cellular phone device 3 is not in the private communication state according to the notice of state inputted from the cellular phone device 3, step S3 makes a negative determination. In this case, both steps S2, S3 make negative determinations, and the control unit 4 determines that the cellular phone device 3 is in the stand-by state. Thus, at step S4, the control unit 4 causes a stand-by screen to pop-up display a notice of incoming mail screen, e.g., display a popup window to visually notify an incoming mail. Simultaneously, the control unit 4 causes the speakers 12 and 13 to cause notice of incoming mail sound to acoustically notify an incoming mail. Specifically, as shown in FIG. 6, the control unit 4 causes a route guidance screen 22 to pop-up display a notice of incoming mail screen 23 in a condition where: the control unit 4 causes the display unit 16 to display the route guidance screen 22 as a stand-by screen in a route guidance operation; and the cellular phone device 3 receives an incoming mail. In the route guidance screen 22, for example, a current position of the vehicle is superimposed on a map screen. In the present operation, a user views the notice of incoming mail screen 23 pop-up displayed on the route guidance screen 22. Thereby, a user can visually recognize an incoming mail in real time. In addition, a user can hear the notice of incoming mail sound outputted from the speakers 12 and 13. Thereby, a user can acoustically recognize an incoming mail in real time.

Figure 7:
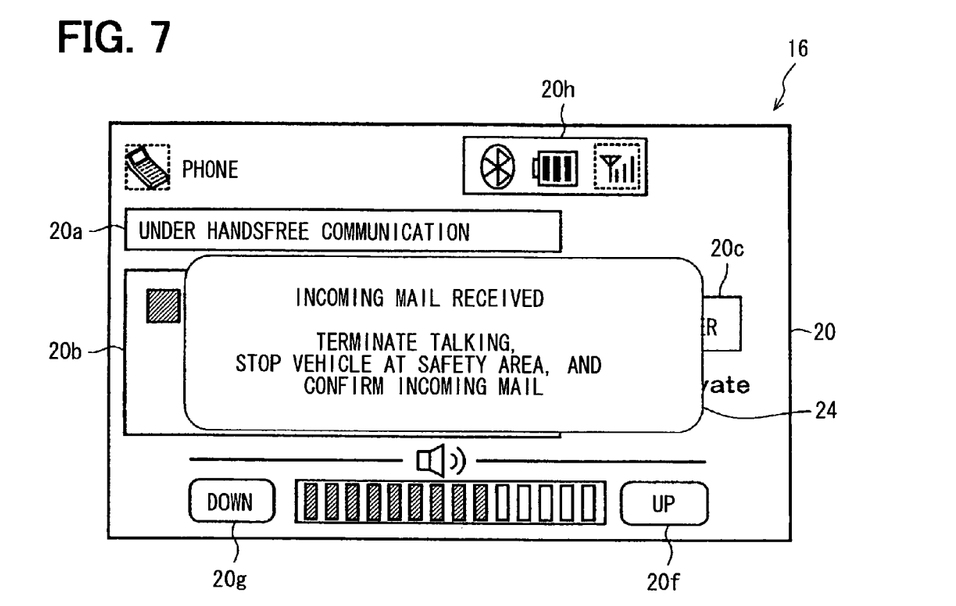
FIG. 7 is schematic view showing the notice of incoming mail screen displayed on an under handsfree communication notice screen.

When the control unit 4 determines that the cellular phone device 3, which receives the incoming mail, is in the handsfree communication state according to the notice of state inputted from the cellular phone device 3, step S2 makes a positive determination. Thus, at step S5, the control unit 4 causes the under handsfree communication notice screen to pop-up display the notice of incoming mail screen. Simulta-neously, the control unit 4 causes the speakers 12 and 13 to cause notice of incoming mail sound to acoustically notify an incoming mail. In the present operation, when the control unit 4 causes the display unit 16 to display the under handsfree communication notice screen 20 shown in FIG. 3 and when the cellular phone device 3 receives an incoming mail, as shown in FIG. 7, the control unit 4 causes the under handsfree communication notice screen 20 to pop-up display a notice of incoming mail screen 24. Thereby, a user can view the notice of incoming mail screen 24, which is pop-up displayed on the under handsfree communication notice-screen 20. Thus, a user can visually recognize an incoming mail in real time. In addition, a user can hear the notice of incoming mail sound outputted from the speakers 12 and 13. Thus, a user can acoustically recognize an incoming mail in real time.

It is noted that the control unit 4 sets a sound volume level of the notice of incoming mail sound, which is outputted when the cellular phone device 3 is in the handsfree communication state, smaller than a sound volume level of the notice of incoming mail sound, which is outputted when the cellular phone device 3 is in the stand-by state. For example, when a user manually sets the sound volume level of the notice of incoming mail sound in the stand-by state, the control unit 4 automatically sets the sound volume level of the notice of incoming mail sound in the handsfree communication state to be smaller than the manually set sound volume level for the stand-by state. Alternatively, when a user manually sets the sound volume level of the notice of incoming mail sound in the handsfree communication state, the control unit 4 automatically sets the sound volume level of the notice of incoming mail sound in the stand-by state to be larger than the manually set sound volume level in the handsfree communication state.

When the control unit 4 determines that the cellular phone device 3, which receives the incoming mail, is in the private communication state according to the notice of state inputted from the cellular phone device 3, step S3 makes a positive determination. Thus, at step S6, the control unit 4 causes the under private communication notice screen to pop-up display the notice of incoming mail screen. In this case, the control unit 4 does not cause the speakers 12 and 13 to cause notice of incoming mail sound to acoustically notify an incoming mail. In the present operation, when the control unit 4 causes the display unit 16 to display the under private communication notice screen 21 shown in FIG. 3 and when the cellular phone device 3 receives an incoming mail, the control unit 4 causes the under private communication notice screen 21 to pop-up display a notice of incoming mail screen 25 shown in FIG. 8. In this case, the control unit 4 does not cause the speakers 12 and 13 to cause the notice of incoming mail sound. Thereby, a user can view the notice of incoming mail screen 25, which is pop-up displayed on the under private communication notice screen 21. In addition, only the notice of incoming mail screen 25 is displayed, without outputting of the notice of incoming mail sound. Thereby, an incoming mail is hard to be noticed by an occupant other than a user.

As described above, according to the in-vehicle handsfree device 2 of the present first embodiment, the display unit 16 displays the notice of incoming mail screen 24, and the speakers 12 and 13 output the notice of incoming mail sound, in a condition where:

the in-vehicle handsfree device 2 communicates with the cellular phone device 3 via the HFP and the MAP; and the cellular phone device 3, which receives an incoming mail, is in the handsfree communication state.

Figure 8:
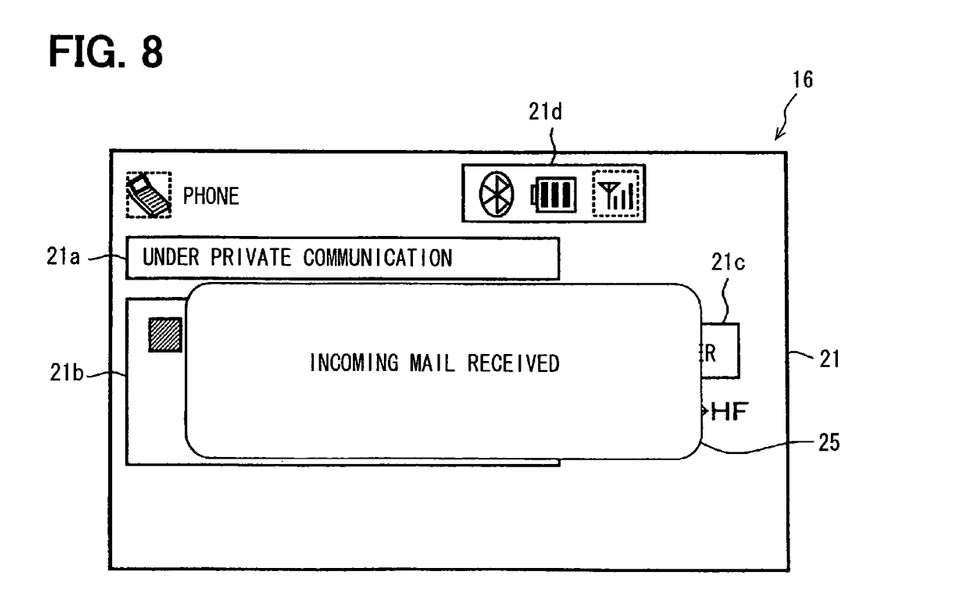
FIG. 8 is a schematic view showing a notice of incoming mail screen displayed on under private communication notice screen.

Alternatively, only the display unit 16 displays the notice of incoming mail screen 24, and the speakers 12 and 13 do not output the notice of incoming mail sound, in a condition where the cellular phone device 3, which receives an incoming mail, is in the private communication state. Therefore, an occupant other than a user hardly notices an incoming mail, and thereby user's privacy can be secured. Thus, an incoming mail can be appropriately treated, without spoiling of user's intention.

In addition, sound volume of the notice of incoming mail sound, which is outputted when the cellular phone device 3 is in the handsfree communication state, is set smaller than sound volume of the notice of incoming mail sound, which is outputted when the cellular phone device 3 is in the stand-by state. Thereby, when the cellular phone device 3 is in the stand-by state, a user can steadily recognize an incoming mail by being notified with the notice of incoming mail sound of large sound volume. On the other hand, when the cellular phone device 3 is in the handsfree communication state, sound volume of the notice of incoming mail sound is set to be small. Thereby, the notice of incoming mail sound can be restricted from exerting influence to incoming voice of a handsfree communication, while a user can recognize an incoming mail. Thus, the notice of incoming mail sound can be restricted from interrupting incoming voice of a handsfree communication.

Second Embodiment

As follows, the present embodiment will be described with reference to FIG. 9. In the first embodiment, when the cellular phone device 3, which receives an incoming mail, is in the private communication state, the notice of incoming mail screen 25 is pop-up displayed on the under private communication notice screen 21 as shown in FIG. 8. Thereby, a user is visually notified of an incoming mail. In the present second embodiment, when the cellular phone device 3, which receives an incoming mail, is in the private communication state, a user is not notified of an incoming mail.

Figure 9:
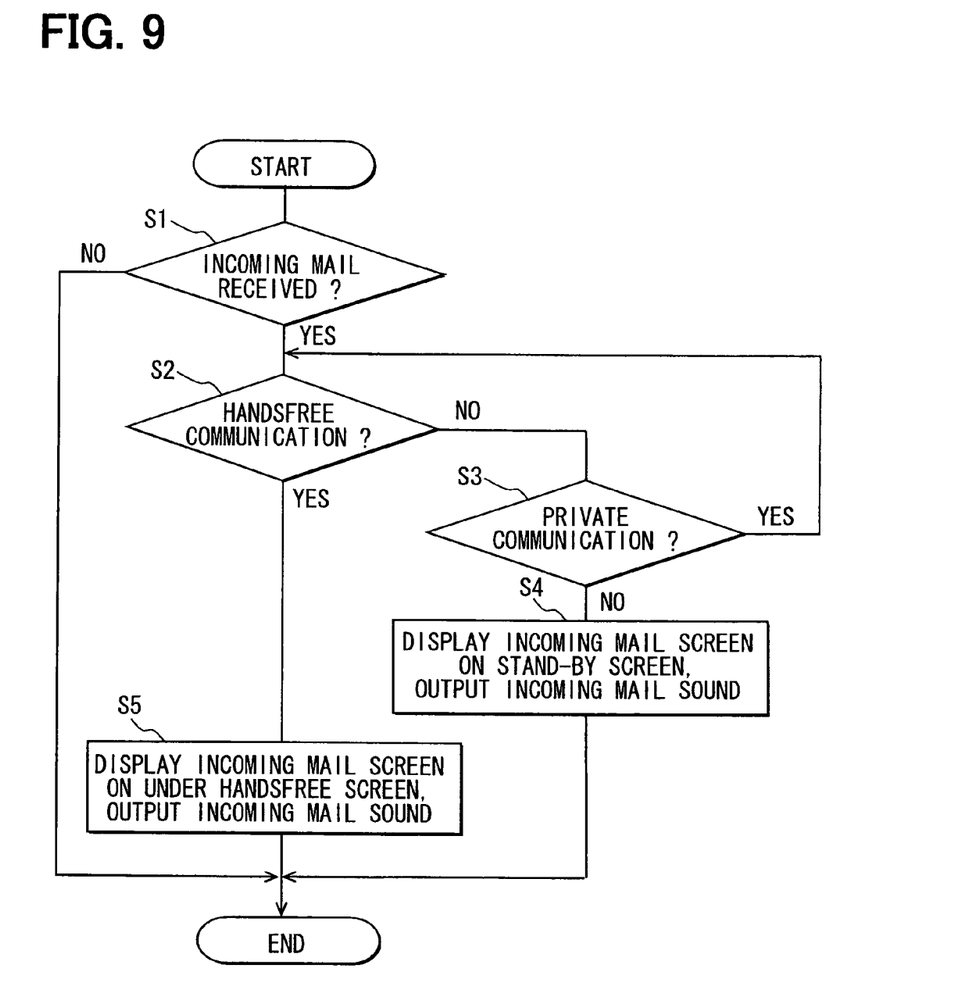
FIG. 9 is a flowchart showing an operation of the in-vehicle apparatus according to a second embodiment.

Specifically, as shown in FIG. 9, first, the control unit 4 starts an incoming mail detection operation. When the control unit 4 determines that the cellular phone device 3 receives an incoming mail, step S1 makes a positive determination. Further, when the control unit 4 determines that the cellular phone device 3, which receives an incoming mail, is in the private communication state, step S2 makes a negative determination, and subsequent step S3 makes a positive determination. In this case, the processing returns to steps S2 and S3, without outputting of the notice of incoming mail sound from the speakers 12 and 13 to notify an incoming mail. In addition, dissimilarly to the first embodiment, the processing returns to steps S2 and S3, without pop-up displaying of the notice of incoming mail screen on the under private communication notice screen to indicate reception of an incoming mail. At steps S2 and S3, it is determined again, whether the cellular phone device 3, which receives an incoming mail, is either in a handsfree communication state, in the private communication state, or in the stand-by state.

When the control unit 4 determines that the state of the cellular phone device 3, which receives an incoming mail, changes from the private communication state to the handsfree communication state, step S2 makes a positive determination. Thus, at step S5, similarly to the first embodiment, the control unit 4 causes the under handsfree communication notice screen 20 to pop-up display the notice of incoming mail screen 24 to visually notify an incoming mail. Simultaneously, the control unit 4 causes the speakers 12 and 13 to cause the notice of incoming mail sound to acoustically notify an incoming mail. Alternatively, when the control unit 4 determines that the state of the cellular phone device 3, which receives the incoming mail, changes from the private communication state to the stand-by state, steps S2, S3 make negative determinations. In this case, at Step S4, the control unit 4 causes the stand-by screen 22 to pop-up display the notice of incoming mail screen 23. Simultaneously, the control unit 4 causes the speakers 12 and 13 to cause the notice of incoming mail sound to acoustically notify an incoming mail.

As described above, according to the in-vehicle handsfree device 2 of the present second embodiment, similarly to the first embodiment, the display unit 16 displays the notice of incoming mail screen 24, and the speakers 12 and 13 output the notice of incoming mail sound, in a condition where: the in-vehicle handsfree device 2 communicates with the cellular phone device 3 via the HFP and the MAP; and the cellular phone device 3, which receives an incoming mail, is in the handsfree communication state. Alternatively, the display unit 16 does not display the notice of incoming mail screen 24, and the speakers 12 and 13 do not output the notice of incoming mail sound, in a condition where the cellular phone device 3, which receives an incoming mail, is in the private communication state. Therefore, user's privacy can be secured. Thus, an incoming mail can be appropriately treated, without spoiling of user's intention.

Further, when the state of the cellular phone device 3, which receives an incoming mail, changes from the private communication state to either the handsfree communication state or the stand-by state, the display unit 16 displays the notice of incoming mail screens 24 and 23, and the speakers 12 and 13 output the notice of incoming mail sound. Therefore, a user can recognize an incoming mail by changing the state of the cellular phone device 3 from the private communication to the handsfree communication or terminating a private communication.

Other Embodiments

The function of the in-vehicle handsfree device may be incorporated in another in-vehicle apparatus, such as an in-vehicle navigation device.

In the above embodiment, the display device has a touch sensor including the transfer switch manipulated to change the private communication to the handsfree communication, the transfer switch manipulated to change the handsfree communication to the private communication, the response switch manipulated to respond to an incoming call, the response refusal switch manipulated to refuse an incoming call. Alternatively, the transfer switches, the response switch, the response refusal switch, and the like may be mechanical switches, for example. In this case, the mechanical switches may be, for example, located in an area close to the handle or an area between a driver's seat and a passenger seat. In that, case, the display device may display an operating procedure of the switches.

The indication regions and the switches in the notice screens may be in other layout. In the above first and second embodiments, an in-vehicle apparatus (in-vehicle handsfree device) having a handsfree function determines the state of the cellular phone device and determines the mode of the notification of an incoming mail, after the cellular phone device transmits the notice of incoming mail to the in-vehicle apparatus. Alternatively, the cellular phone device may determine whether to transmit the notice of incoming mail according to self-determination of the state of the cellular phone. Specifically, when the cellular phone device in the handsfree communication state receives an incoming mail, the cellular phone device may transmit the notice of incoming mail to the in-vehicle apparatus to cause the in-vehicle apparatus to notify an incoming mail. Alternatively, when the cellular phone device in the private communication state receives an incoming mail, the cellular phone device may not transmit the notice of incoming mail to the in-vehicle apparatus, not to cause the in-vehicle apparatus to notify an incoming mail. In the present structure, user's privacy can be steadily secured when a user receives an incoming mail via the private communication. Thus, an incoming mail can be appropriately treated, without spoiling of user's intention.

Further, the cellular phone device may distinguish the notice of incoming mail, which is transmitted to the in-vehicle apparatus when the cellular phone device in the handsfree communication state receives an incoming mail, from the notice of incoming mail, which is transmitted to the in-vehicle apparatus when the cellular phone device in the private communication state receives an incoming mail. In this case, the notice of incoming mail, which is caused by the in-vehicle apparatus when the cellular phone device in the handsfree communication state receives an incoming mail, can be distinguished from the notice of incoming mail, which is caused by the in-vehicle apparatus when the cellular phone device in the private communication state receives an incoming mail. Thus, the notice of incoming mail screen may be displayed, and notice of incoming mail sound may be outputted, when the cellular phone device in the handsfree communication state receives an incoming mail. Alternatively, only the notice of incoming mail screen may be displayed, and notice of incoming mail sound may not be outputted, when the cellular phone device in the private communication state receives an incoming mail. In the present structure, user's privacy can be secured when a user receives an incoming mail via the private communication. Thus, an incoming mail can be appropriately treated, without spoiling of user's intention.

Summarizing the above description, in the above in-vehicle apparatus, a communication unit is configured to communicate with a cellular phone device simultaneously using a handsfree communication protocol for handsfree communication and a mail transfer protocol for mail transfer. The cellular phone device is selectable one of:

i) a handsfree communication state where voice inputted via a voice input unit at a side of the in-vehicle apparatus is transmitted as outgoing voice to a counterpart, and voice transmitted from a counterpart is outputted as incoming voice via a voice output unit at a side of the in-vehicle apparatus by opening a voice path with the in-vehicle apparatus when communicating using the handsfree communication protocol; and ii) a handset communication state where voice inputted via a voice input unit at a side of the cellular phone device is transmitted as outgoing voice to a counterpart, and voice transmitted from a counterpart is outputted as incoming voice via a voice output unit at a side of the cellular phone device by closing the voice path with the in-vehicle apparatus.

An incoming mail determination unit is configured to determine whether the cellular phone device, which communicates with the communication unit using the mail transfer protocol, receives an incoming mail.

A condition determination unit is configured to determine whether the cellular phone device, which communicates with the communication unit using the handsfree communication protocol, selects one of the handsfree communication state and the handset communication state.

A control unit is configured to perform notice of incoming mail to a user for notifying an incoming mail, in a condition where:

i) the incoming mail determination unit determines that the cellular phone device, which communicates with the communication unit using the mail transfer protocol, receives an incoming mail; and ii) the condition determination unit determines that the cellular phone device, which receives an incoming mail, selects the handsfree communication state.

Alternatively, the control unit is configured to perform notice of incoming mail to a user in a mode in which an occupant other than a user hardly notices an incoming mail, compared with notice of incoming mail when the condition determination unit determines that the cellular phone device, which receives an incoming mail, selects the handsfree communication state, in a condition where:

i) the incoming mail determination unit determines that the cellular phone device, which communicates with the communication unit using the mail transfer protocol, receives an incoming mail; and ii) the condition determination unit determines that the cellular phone device, which receives an incoming mail, selects the handset communication state.

In the present structure, when the cellular phone device in the handsfree communication state receives an incoming mail, the cellular phone device performs notice of incoming mail. Thereby, a user can recognize an incoming mail in real time. Alternatively, when the cellular phone device in the handset communication state receives an incoming mail, the cellular phone device performs notice of incoming mail to a user in the mode in which an occupant other than the user hardly notices an incoming mail. Thereby, user's privacy can be secured, and an incoming mail can be appropriately treated without spoiling of user's intention.

In the above in-vehicle apparatus, in the mode in which an occupant other than a user hardly notices an incoming mail compared with notice of incoming mail when the condition determination unit determines that the cellular phone device, which receives an incoming mail, selects the handsfree communication state, the control unit is configured to cause a display unit at a side of the in-vehicle apparatus to display a notice of incoming mail screen for notifying an incoming mail, without causing the voice output unit to output the notice of incoming mail sound for notifying an incoming mail.

In the present structure, a notice of incoming mail screen is displayed on the in-vehicle apparatus. Thereby, a user can visually recognize an incoming mail in, real time, while user's privacy is secured.

In the above in-vehicle apparatus, the control unit is configured to perform notice of incoming mail to a user for notifying an incoming mail, in a condition where:

i) the incoming mail determination unit determines that the cellular phone device, which communicates with the communication unit using the mail transfer protocol, receives an incoming mail; and ii) the condition determination unit determines that the cellular phone device, which receives an incoming mail, selects the handsfree communication state.

Alternatively, the control unit does not perform notice of incoming mail to a user, in a condition where:

i) the incoming mail determination unit determines that the cellular phone device, which communicates with the communication unit using the mail transfer protocol, receives an incoming mail; and ii) the condition determination unit determines that the cellular phone device, which receives an incoming mail, selects the handset communication state.

In the present structure, when the cellular phone device in the handsfree communication state receives an incoming mail, the cellular phone device performs notice of incoming mail. Thereby, a user can recognize an incoming mail in real time. Alternatively, when the cellular phone device in the handset communication state receives an incoming mail, the cellular phone device does not perform notice of incoming mail to a user. Thereby, user's privacy can be steadily secured, and an incoming mail can be appropriately treated without spoiling of user's intention.

In the above in-vehicle apparatus, the control unit is configured to perform notice of incoming mail to a user in a condition where the condition determination unit determines that a state of the cellular phone device, which receives an incoming mail, changes from the handset communication state to the handsfree communication state subsequent to:

i) the incoming mail determination unit determines that the cellular phone device, which communicates with the communication unit using the mail transfer protocol, receives an incoming mail; and ii) the condition determination unit determines that the cellular phone device, which receives an incoming mail, selects the handset communication state.

In the present structure, a user can recognize an incoming mail subsequent to change in the cellular phone device from the handset communication state to the handsfree communication state in response to manipulation of a user to change the cellular phone device from the handset communication to the handsfree communication.

In the above in-vehicle apparatus, the control unit is configured to perform notice of incoming mail to a user in a condition where the condition determination unit determines that a state of the cellular phone device, which receives an incoming mail, changes from the handset communication state to a stand-by state subsequent to:

i) the incoming mail determination unit determines, that the cellular phone device, which communicates with the communication unit using the mail transfer protocol, receives an incoming mail; and ii) the condition determination unit determines that the cellular phone device, which receives an incoming mail, selects the handset communication state.

In the present structure, a user can recognize an incoming mail subsequent to change in the cellular phone device from the handset communication state to the stand-by communication state in response to manipulation of a user to terminate handset communication.

In the above in-vehicle apparatus, the control unit is configured to set a first sound volume level to be smaller than a second sound volume level, wherein i) the voice output unit at a side of the in-vehicle apparatus outputs notice of incoming mail sound at the first sound volume level when the cellular phone device, which receives an incoming mail, selects the handset communication state, and ii) the voice output unit at a side of the in-vehicle apparatus outputs notice of incoming mail sound at the second sound volume level when the cellular phone device, which receives an incoming mail, selects the stand-by state.

In the present structure, a user can recognize an incoming mail steadily by receiving notice of incoming mail sound of large sound volume when the cellular phone device is in the stand-by state. Alternatively, a user can recognize an incoming mail by receiving notice of incoming mail sound at the small sound volume level when the cellular phone device is in the handsfree communication state. In this case, the notice of incoming mail sound can be restricted from exerting influence to incoming voice via the handsfree communication.

Thus, the notice of incoming mail sound can be restricted from interrupting incoming voice via the handsfree communication.

The cellular phone device is configured to communicate with an in-vehicle apparatus having a handsfree function simultaneously using a handsfree communication protocol for handsfree communication and a mail transfer protocol for mail transfer, the cellular phone device selectable one of:

i) a handsfree communication state where voice inputted via a voice input unit of the in-vehicle apparatus is transmitted as outgoing voice to a counterpart, and voice transmitted from a counterpart is outputted as incoming voice via a voice output unit of the in-vehicle apparatus by opening a voice path with the in-vehicle apparatus in a state where communicating using the handsfree communication protocol; and ii) a handset communication state where voice inputted via a voice input unit of the cellular phone device is transmitted as outgoing voice to a counterpart, and voice transmitted from a counterpart is outputted as incoming voice via a voice output unit of the cellular phone device by closing the voice path with the in-vehicle apparatus.

In a condition where the cellular phone device communicates with the in-vehicle apparatus simultaneously using the handsfree communication protocol and the mail transfer protocol, i) the cellular phone device notifies the in-vehicle apparatus of reception of an incoming mail when the cellular phone device selects the handsfree communication state and when the cellular phone device receives an incoming mail; and ii) the cellular phone device does not notify the in-vehicle apparatus of reception of an incoming mail when the cellular phone device selects the handset communication state and when the cellular phone device receives an incoming mail.

In the present structure, when the cellular phone selects the handsfree communication state and when the cellular phone receives an incoming mail, the cellular phone performs notice of incoming mail to the in-vehicle apparatus. Thereby, notice of incoming mail to an in-vehicle apparatus can be performed. Alternatively, when the cellular phone selects the handset communication state and when the cellular phone receives an incoming mail, the cellular phone does not perform notice of incoming mail to the in-vehicle apparatus. Thereby, notice of incoming mail to an in-vehicle apparatus can be prohibited. Thus, user's privacy can be steadily secured, and an incoming mail can be appropriately treated, without spoiling of user's intention.

The above structures of the embodiments can be combined as appropriate. The above processings such as calculations and determinations are not limited being executed by the control unit 4. The control unit may have various structures including the control unit 4 shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. An in-vehicle apparatus having a handsfree function, the in-vehicle apparatus comprising:
   a communication unit configured to communicate with a cellular phone device simultaneously using a handsfree communication protocol for handsfree communication and a mail transfer protocol for mail transfer, the cellular phone device being selectively in one of:
   i) a handsfree communication state where outgoing voice inputted via a voice input unit of the in-vehicle apparatus is transmitted to a counterpart, and incoming voice transmitted from the counterpart is outputted via a voice output unit of the in-vehicle apparatus when opening a voice path with the in-vehicle apparatus and when communicating with the in-vehicle apparatus using the handsfree communication protocol; and
   ii) a handset communication state where outgoing voice inputted via a voice input unit of the cellular phone device is transmitted to the counterpart, and incoming voice transmitted from the counterpart is outputted via a voice output unit of the cellular phone device when closing the voice path with the in-vehicle apparatus,
   an incoming mail determination unit configured to determine whether the cellular phone device, which communicates with the communication unit using the mail transfer protocol, receives incoming mail;
   a condition determination unit configured to determine whether the cellular phone device, which communicates with the communication unit using the handsfree communication protocol, is in one of the handsfree communication state and the handset communication state; and
   a control unit:
   configured to perform notice of incoming mail for notifying a user of the incoming mail in a handsfree mode in a condition where:
   i) the incoming mail determination unit determines that the cellular phone device, which communicates with the communication unit using the mail transfer protocol, receives the incoming mail; and
   ii) the condition determination unit determines that the cellular phone device is in the handsfree communication state, and
   configured to perform the notice of incoming mail for notifying a user of the incoming mail in a handset mode, such that an occupant other than a user is less likely to notice the incoming mail as compared with the notice given in the handsfree mode, by causing a display unit of the in-vehicle apparatus to display a notice of incoming mail screen, without causing the voice output unit of the in-vehicle apparatus to output a notice of incoming mail sound, in a condition where:
   i) the incoming mail determination unit determines that the cellular phone device, which communicates with the communication unit using the mail transfer protocol, receives the incoming mail; and
   ii) the condition determination unit determines that the cellular phone device is in the handset communication state.

2. The in-vehicle apparatus according to claim 1, wherein the voice output unit of the in-vehicle apparatus outputs notice of incoming mail sound at a first sound volume level when the cellular phone device is in the handset communication state,
   the voice output unit of the in-vehicle apparatus outputs notice of incoming mail sound at a second sound volume level when the cellular phone device is in the stand-by state, and
   the control unit is configured to set the first sound volume level to be smaller than the second sound volume level.

3. An in-vehicle apparatus having a handsfree function, the in-vehicle apparatus comprising:
   a communication unit configured to communicate with a cellular phone device simultaneously using a handsfree communication protocol for handsfree communication and a mail transfer protocol for mail transfer, the cellular phone device being selectively in one of:
   i) a handsfree communication state where outgoing voice inputted via a voice input unit of the in-vehicle apparatus is transmitted to a counterpart, and incoming voice transmitted from the counterpart is outputted via a voice output unit of the in-vehicle apparatus when opening a voice path with the in-vehicle apparatus and when communicating with the in-vehicle apparatus using the handsfree communication protocol; and
   ii) a handset communication state where outgoing voice inputted via a voice input unit of the cellular phone device is transmitted to the counterpart, and incoming voice transmitted from the counterpart is outputted via a voice output unit of the cellular phone device when closing the voice path with the in-vehicle apparatus,
   an incoming mail determination unit configured to determine whether the cellular phone device, which communicates with the communication unit using the mail transfer protocol, receives incoming mail;
   a condition determination unit configured to determine whether the cellular phone device, which communicates with the communication unit using the handsfree communication protocol, is in one of the handsfree communication state and the handset communication state; and
   a control unit:
   configured to perform notice of incoming mail for notifying a user of incoming mail in a condition where:
   i) the incoming mail determination unit determines that the cellular phone device, which communicates with the communication unit using the mail transfer protocol, receives the incoming mail; and
   ii) the condition determination unit determines that the cellular phone device is in the handsfree communication state, and
   configured not to perform notice of incoming mail for notifying a user of the incoming mail in a condition where:
   i) the incoming mail determination unit determines that the cellular phone device, which communicates with the communication unit using the mail transfer protocol, receives the incoming mail; and
   ii) the condition determination unit determines that the cellular phone device is in the handset communication state.

4. The in-vehicle apparatus according to claim 3, wherein the control unit is configured to perform notice of incoming mail to a user in a condition where the condition determination unit determines that a state of the cellular phone device changes from the handset communication state to the handsfree communication state subsequent to:
   i) the incoming mail determination unit determines that the cellular phone device, which communicates with the communication unit using the mail transfer protocol, receives the incoming mail; and
   ii) the condition determination unit determines that the cellular phone device is in the handset communication state.

5. The in-vehicle apparatus according to claim 3,
wherein the condition determination unit is configured to determine whether the cellular phone device is in one of:
   i) the handsfree communication state where the cellular phone device communicates with the communication unit using the handsfree communication protocol;
   ii) the handset communication state; and
   iii) a stand-by state where the cellular phone device waits an incoming call,
the control unit is configured to perform the notice of incoming mail to a user when the condition determination unit determines that a state of the cellular phone device changes from the handset communication state to the stand-by state subsequent to:
   i) the incoming mail determination unit determines that the cellular phone device, which communicates with the communication unit using the mail transfer protocol, receives the incoming mail; and
   ii) the condition determination unit determines that the cellular phone device is in the handset communication state.

6. The in-vehicle apparatus according to claim 3,
wherein the voice output unit of the in-vehicle apparatus outputs notice of incoming mail sound at a first sound volume level when the cellular phone device is in the handset communication state,
the voice output unit of the in-vehicle apparatus outputs notice of incoming mail sound at a second sound volume level when the cellular phone device is in the stand-by state, and
the control unit is configured to set the first sound volume level to be smaller than the second sound volume level.

7. A cellular phone device configured to communicate with an in-vehicle apparatus having a handsfree function simultaneously using a handsfree communication protocol for handsfree communication and a mail transfer protocol for mail transfer, wherein the cellular phone device being selectively in one of:
   i) a handsfree communication state where outgoing voice inputted via a voice input unit of the in-vehicle apparatus is transmitted to a counterpart and incoming voice transmitted from the counterpart is outputted via a voice output unit of the in-vehicle apparatus when opening a voice path with the in-vehicle apparatus and when communicating with the in-vehicle apparatus using a handsfree communication protocol; and
   ii) a handset communication state where outgoing voice inputted via a voice input unit of the cellular phone device is transmitted to the counterpart, and incoming voice transmitted from the counterpart is outputted via a voice output unit of the cellular phone device when closing the voice path with the in-vehicle apparatus,
wherein in a condition where the cellular phone device communicates with the in-vehicle apparatus simultaneously using the handsfree communication protocol and the mail transfer protocol:
   i) the cellular phone device sends notice of incoming mail to the in-vehicle apparatus when the cellular phone device is in the handsfree communication state and when the cellular phone device receives incoming mail; and
   ii) the cellular phone device does not send notice of the incoming mail to the in-vehicle apparatus when the cellular phone device is in the handset communication state and when the cellular phone device receives the incoming mail.

8. A method for controlling communication between an in-vehicle apparatus and a cellular phone device, the method comprising:
communicating the in-vehicle apparatus with the cellular phone device simultaneously using a handsfree communication protocol for handsfree communication and a mail transfer protocol for mail transfer;
determining whether the cellular phone device is in one of:
   i) a handsfree communication state where outgoing and incoming voice is transmitted via input and output units of the in-vehicle apparatus when opening a voice path with the in-vehicle apparatus and communicating with the in-vehicle apparatus using the handsfree communication protocol; and
   ii) a handset communication state where outgoing and incoming voice is transmitted via input and output units of the cellular phone device when closing the voice path;
determining whether the cellular phone device receives incoming mail;
notifying a user of the incoming mail in a handsfree mode in response to determination that the cellular phone device is in the handsfree communication state and determination that the cellular phone device receives the incoming mail; and
notifying a user of the incoming mail in a handset mode in response to determination that the cellular phone device is in the handset communication state and determination that the cellular phone device receives the incoming mail, such that an occupant other than a user is less likely to notice the incoming mail as compared with the notice received in the handsfree mode, by causing a display unit of the in-vehicle apparatus to display a notice of incoming mail screen, without causing a voice output unit of the in-vehicle apparatus to output a notice of incoming, mail sound.

9. A method for controlling communication between an in-vehicle apparatus and a cellular phone device, the method comprising:
communicating the in-vehicle apparatus with the cellular phone device simultaneously using a handsfree communication protocol for handsfree communication and a mail transfer protocol for mail transfer;
determining whether the cellular phone device is in one of:
   i) a handsfree communication state where outgoing and incoming voice is transmitted via input and output units of the in-vehicle apparatus when opening a voice path with the in-vehicle apparatus and communicating with the in-vehicle apparatus using the handsfree communication protocol; and
   ii) a handset communication state where outgoing and incoming voice is transmitted via input and output units of the cellular phone device when closing the voice path;
determining whether the cellular phone device receives an incoming mail;

notifying a user of the incoming mail in response to determination that the cellular phone device receives the incoming mail and determination that the cellular phone device is in the handsfree communication state; and not notifying a user of the incoming mail in response to determination that the cellular phone device receives the incoming mail and determination that the cellular phone device is in the handset communication state.

10. A method for controlling communication between a cellular phone device and an in-vehicle apparatus, the method comprising:

communicating the cellular phone device with the in-vehicle apparatus simultaneously using a handsfree communication protocol for handsfree communication and a data transfer protocol for data transfer;

sending notice of incoming mail from the cellular phone device to the in-vehicle apparatus when the cellular phone device receives incoming mail and when the cellular phone device is in a handsfree communication state where outgoing and incoming voice is transmitted via input and output units of the in-vehicle apparatus when opening a voice path with the in-vehicle apparatus and communicating with the in-vehicle apparatus using the handsfree communication protocol; and not sending the notice of incoming mail from the cellular phone device to the in-vehicle apparatus when the cellular phone device receives the incoming mail and when the cellular phone device is in a handset communication state where outgoing and incoming voice is transmitted via input and output units of the cellular phone device when closing the voice path.

11. A non-transitory computer readable medium comprising instructions being executed by a computer, the instructions including a method for controlling communication between an in-vehicle apparatus and a cellular phone device, the method comprising:

communicating the in-vehicle apparatus with the cellular phone device simultaneously using a handsfree communication protocol for handsfree communication and a mail transfer protocol for mail transfer;

determining whether the cellular phone device is in one of:
  i) a handsfree communication state where outgoing and incoming voice is transmitted via input and output units of the in-vehicle apparatus when opening a voice path with the in-vehicle apparatus and communicating with the in-vehicle apparatus using the handsfree communication protocol; and
  ii) a handset communication state where outgoing and incoming voice is transmitted via input and output units of the cellular phone device when closing the voice path;

determining whether the cellular phone device receives incoming mail;

notifying a user of incoming mail in a handsfree mode in response to determination that the cellular phone device is in the handsfree communication state and determination that the cellular phone device receives the incoming mail; and notifying a user of the incoming mail in a handset mode in response to determination that the cellular phone device is in the handset communication state and determination that the cellular phone device receives the incoming mail, such that an occupant other than a user is less likely to notice the incoming mail as compared with the notice given in the handsfree mode, by causing a display unit of the in-vehicle apparatus to display a notice of incoming mail screen, without causing a voice output unit of the in-vehicle apparatus to output a notice of incoming mail sound.

12. A non-transitory computer readable medium comprising instructions being executed by a computer, the instructions including a method for controlling communication between an in-vehicle apparatus and a cellular phone device, the method comprising:

communicating the in-vehicle apparatus with the cellular phone device simultaneously using a handsfree communication protocol for handsfree communication and a mail transfer protocol for mail transfer;

determining whether the cellular phone device is in one of:
  i) a handsfree communication state where outgoing and incoming voice is transmitted via input and output units of the in-vehicle apparatus when opening a voice path with the in-vehicle apparatus and communicating with the in-vehicle apparatus using the handsfree communication protocol; and
  ii) a handset communication state where outgoing and incoming voice is transmitted via input and output units of the cellular phone device when closing the voice path;

determining whether the cellular phone device receives incoming mail;

notifying a user of the incoming mail in response to determination that the cellular phone device receives the incoming mail and determination that the cellular phone device is in the handsfree communication state; and not notifying a user of the incoming mail in response to determination that the cellular phone device receives the incoming mail and determination that the cellular phone device is in the handset communication state.

13. A non-transitory computer readable medium comprising instructions being executed by a computer, the instructions including a method for controlling communication between a cellular phone device and an in-vehicle apparatus, the method comprising:

communicating the cellular phone device with the in-vehicle apparatus simultaneously using a handsfree communication protocol for handsfree communication and a data transfer protocol for data transfer;

sending notice of incoming mail from the cellular phone device to the in-vehicle apparatus when the cellular phone device receives incoming mail and when the cellular phone device is in a handsfree communication state where outgoing and incoming voice is transmitted via input and output units of the in-vehicle apparatus when opening a voice path with the in-vehicle apparatus and communicating with the in-vehicle apparatus using the handsfree communication protocol; and not sending the notice of incoming mail from the cellular phone device to the in-vehicle apparatus when the cellular phone device receives the incoming mail and when the cellular phone device is in a handset communication state where outgoing and incoming voice is transmitted via input and output units of the cellular phone device when closing the voice path.

14. The cellular phone device according to claim 7,
wherein in a condition where the cellular phone device communicates with the in-vehicle apparatus simultaneously using the handsfree communication protocol and the mail transfer protocol:
  i) the cellular phone device sends the notice of incoming mail to the in-vehicle apparatus on determination that the cellular phone device is in the handsfree communication state and on determination that the cellular phone device receives the incoming mail; and ii) the cellular phone device does not send the notice of incoming mail to the in-vehicle apparatus on determination that the cellular phone device is in the handset communication state and on determination that the cellular phone device receives the incoming mail.

* * * * *